Patented Apr. 17, 1951

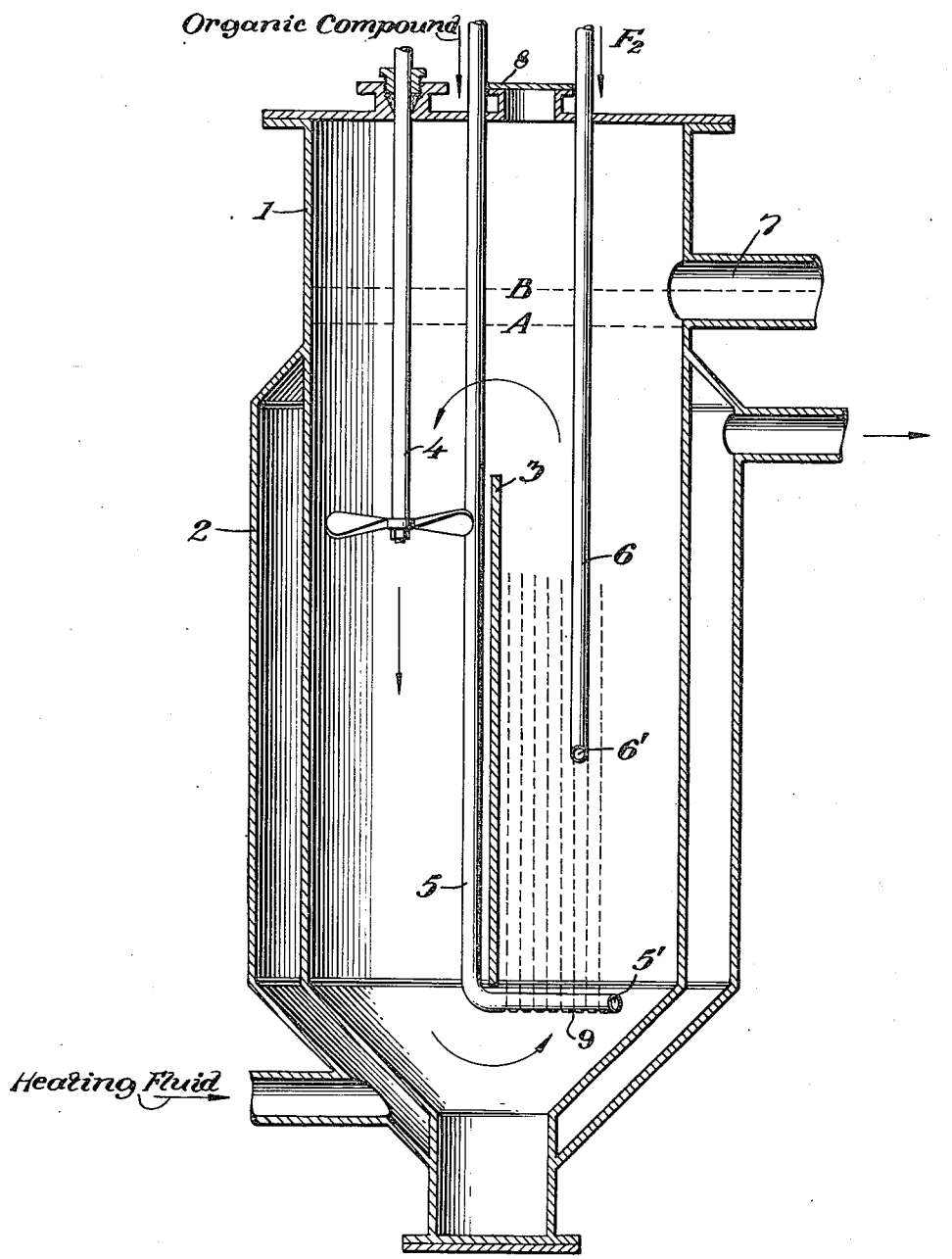

2,549,565

UNITED STATES PATENT OFFICE 2,549,565

METHOD OF FLUORINATING ORGANIC COMPOUNDS WITH MOLTEN SILVER FLUORIDES

Roland G. Benner, Carneys Point, N. J., assignor to the United States of America as represented by the United States Atomic Energy Commission Application February 11, 1946, Serial No. 646,945

5 Claims. (Cl. 260—653)

This invention relates to the fluorination of organic compounds by means of elemental fluorine.

In the past, attempts to effect the fluorination of organic compounds employing elemental fluorine as the fluorinating agent have resulted in a high degree of fluorolysis and consequently in low yields of desired fluorinated products. Such processes employing solid catalyst masses have proved to be exceedingly cumbrous and difficult to control.

It is an object of the present invention to provide a useful method for fluorinating organic compounds by means of elemental fluorine without excessive decomposition and without the control difficulties and cumbrous equipment attendant upon the use of previous fluorination methods employing this reagent. Further objects of the invention will be apparent from the following description thereof.

In accordance with the present invention elemental fluorine in gaseous form and an organic compound to be fluorinated are separately introduced into a body of molten salt of melting point below the desired reaction temperature. The fluorine may be employed alone or diluted with an inert gas or vapor, such as nitrogen or hydrogen fluoride. The organic compound may be employed alone or diluted with an inert liquid, or an inert gas or vapor, such as a perfluorinated kerosene or perfluoroheptane or perfluoromethyl-cyclohexane.

Suitable salts for the purposes of the invention will depend upon the desired temperature of reaction. Since normally the fluorination process may be carried out effectively at temperatures between 200° C. and 500° C., a salt or salt mixture with a melting point appropriate to the reaction temperature may be selected in this operating range. Particularly suitable salt mixtures for carrying out the processes of the invention are mixtures of silver difluoride and silver fluoride (the silver fluoride-difluoride eutectic melts at about 275° C.). Low melting mixtures of silver fluorides with mercury, cobalt or manganese fluorides also may be used.

By introducing the organic compound and elemental fluorine into such salt mixtures at a moderate rate, a fluid reaction medium is readily maintainable throughout the conversion of the organic compound to the desired fluorination product. When the process is conducted in a batch type of operation, the reaction mass may be permitted to cool and the fluorinated organic compound may be withdrawn from the surface of the solid reaction mass. In continuous operations, as well as semi-continuous and batch operations, the fluorinated products may be withdrawn in liquid phase from the molten reaction mass as the reaction proceeds.

The process may be carried out in a continuous manner very readily merely by passing the organic compound to be fluorinated and elemental fluorine separately into an agitated molten mass of the carrier salt and allowing the reactants to rise through a substantial column of the molten mass. The elemental fluorine reacts almost instantly with the silver fluoride in the mixture to form silver difluoride, and the organic material reacts with the resulting silver difluoride so that by the time the organic material reaches the surface it is converted to the fluorinated product. Since the salt mixtures have densities substantially greater than the densities of the fluorinated organic compounds and are relatively immiscible therewith, the products, when produced in liquid phase, are readily separable from the reaction mixture by decantation.

The degree of fluorination may be controlled within a considerable range by varying the concentration of fluorine in the salt mixture. Thus for a high degree of fluorination a high fluorine content is desirable and for a low degree of fluorination a low fluorine content is desirable. In producing a high degree of fluorination it is normally preferred to employ higher temperatures within the specified range than employed in effecting a relatively low degree of fluorination. Salt mixtures comprising a high proportion of silver difluoride are higher melting than the eutectic mixture with a consequent fortunate correlation of the desired and most practicable temperatures.

The invention is particularly applicable to the fluorination of high-boiling compounds which remain in liquid phase during the fluorination process. However it is also applicable to low-boiling compounds. In the latter case the materials may be maintained in liquid phase by application of pressure or may be vaporized in, or prior to introduction into, the system and the fluorination may be effected with the compound in vapor phase. If the product of fluorination is gaseous at the reaction temperature, it may be withdrawn from the reaction chamber in this form continuously during the reaction.

The process of the invention is applicable to the manufacture of perfluorinated lubricants from lubricating oil fractions and to the manufacture of solvents of low volatility by the fluorination of kerosene fractions and other high-molecular aliphatic, aromatic and naphthenic hydrocarbons and their oxygen, sulfur, nitrogen, and sulfoxy derivatives, such as triphenylamine, diphenylsulfide, diphenylsulfone, and diphenyl oxide, in liquid phase, and to the manufacture of relatively volatile fluorinated compounds by the fluorination of compounds of lower molecular weight, such as methane, ethane, propane, butane, pentane, hexane, heptane, octane, cyclohexane, benzene, toluene, xylene, diphenyl, diphenylether and the like, in vapor phase, or, for the less volatile compounds, in liquid phase.

In the attached drawing an apparatus for carrying out the process of the invention is illustrated schematically in section. This apparatus comprises a tank 1 having a jacket 2 and a dividing partition 3. Centrally disposed on one side of the partition 3 is an agitator 4. An inlet pipe 5 for organic compound and an inlet pipe 6 for fluorine are provided with perforated distributing sections 5' and 6' as shown. The sections 5' and 6' have perforations along the bottom and section 5' is located at a substantial distance below section 6'. The tank has an outlet 7 for drawing off gaseous and liquid reaction products and a charge-hole 8 for introducing a salt. The normal operating level for the molten salt mixture is indicated at A and the level for organic reaction product at B.

In operation of this apparatus the tank is charged with a suitable salt mixture and heating fluid is passed through jacket 2 to maintain the desired reaction temperature. When the charge is essentially completely liquefied, the agitator 4 is started to circulate the salt mixture around the baffle or partition 3. Any additional salt mixture necessary for bringing the level to the desired mark is then added and the apparatus is ready to begin the fluorination.

Fluorine is introduced slowly through inlet pipe 6. At the same time organic compound is introduced slowly through inlet pipe 5. Introduction of fluorine and introduction of organic compound are so controlled as to maintain the desired concentration of fluorine in the salt mixture. Fluorination products are withdrawn at 7 and passed to cooling or condensing means.

The extent of fluorination depends upon the temperature and the concentration of silver difluoride in the mixture. To increase the degree of fluorination the temperature is increased and to decrease the extent of fluorination the temperature is decreased. These variations require a corresponding change in the rate of fluorine introduction to maintain a constant proportion of silver difluoride in the salt mixture. When a very high degree of fluorination is desired, the concentration of silver difluoride is raised correspondingly in the reaction mixture. Normally it is convenient to employ a two-step process for fluorinating hydrocarbons to produce perfluorinated compounds or mixtures of perfluorinated compounds. In this case it is convenient to employ a relatively low concentration of silver difluoride and a relatively low temperature in the first step to produce a partially fluorinated material, and then to run this partially fluorinated material through the process again employing a higher concentration of silver difluoride and a higher reaction temperature.

As illustrated in the drawing the single stage process has some of the attributes of a two-stage process in that the fluorine inlet is a substantial distance above the organic compound inlet so that the organic compound first contacts salt mixture of relatively low fluorine content and then, after partial reaction, contacts salt of higher fluorine content as it rises in the tank 1. In this case the temperature is substantially constant and the change in the fluorine concentration in the two reaction zones is relatively small compared to that which can be obtained in a separate two-stage process. However the advantages of the two zones may be obtained in each of the separate steps of the two stage process.

During the reaction a substantial amount of heat is generated and consequently it may be desirable in many cases to employ the jacket 2 to remove rather than to supply heat during the reaction. For this purpose a suitable heat transfer fluid comprises a molten salt or mixture of sufficient heat capacity so that it may serve satisfactorily either as a heating or cooling medium, depending upon the relationship of the temperature of the reaction mixture in tank 1 and the temperature of the heat transfer fluid in jacket 2. In place of a molten salt for circulation through jacket 2, other heat transfer media, such as hot air, flue gas, diphenyl, or steam, may be employed. In view of the reactive nature of some of the commonly employed heat transfer agents with the silver difluoride present in the tank 1, it is preferred to employ a heat transfer medium such as the sodium nitrate nitrite mixtures commonly employed in the naphthalene oxidation art or the silver chloride-fluoride or iodide-fluoride eutectics melting at 290° C. and 90° C., respectively, so that in the event of leakage between tank 1 and jacket 2 serious consequences will not result.

In the following example quantities are in terms of weight unless otherwise indicated.

*Example*

A petroleum lubricating oil fraction distilling in the range 200–300° C. at 10 millimeters of mercury absolute pressure, and elemental fluorine are introduced into a salt mixture in a ratio of oil to fluorine of 1:5. The salt mixture comprises about 70% silver fluoride and 30% silver difluoride. It is maintained at a temperature of approximately 300° C. by suitable control of cooling fluid in the jacket 2. Effluent hydrogen fluoride in vapor phase and fluorocarbons in liquid phase are withdrawn through the outlet 7. No elemental fluorine is contained in the effluent vapors since the fluorine is completely reacted with the silver fluoride in the reaction mass, and silver fluoride is always maintained in excess in this mass. The product of this reaction is passed through a second stage in which a high concentration of silver difluoride (60–80%, preferably about 70% of the mass) is employed and the temperature is maintained at about 350° C. to complete the fluorination of the product to the final perfluorinated compound substantially free of organic hydrogen.

In carrying out the fluorination of a highly volatile material, such as heptane, or a gaseous material, such as methane or ethane, the same procedure is employed except that the organic compound is introduced in vapor phase rather than liquid phase. In this case the product is withdrawn in vapor phase also. Any liquid phase by-products which may form as a result of impurities in the material introduced into the system or as a result of condensation during the process accumulate on the top of the salt mixture and are subsequently withdrawn through outlet 7 along with the reaction product vapors.

It will be understood that I intend to include variations and modifications of the invention and that the preceding examples are illustrative only and in no wise to be construed as limitations upon the invention, the scope of which is defined in the appended claims, wherein

I claim:

1. The process for fluorinating an organic compound which comprises separately and simultaneously injecting the organic compound and elemental fluorine into a molten mass consisting of from 20% to 70% of silver monofluoride and from 80% to 30% of silver difluoride maintained at a temperature between 200° C. and 500° C.

2. The process for fluorinating a hydrocarbon which comprises distributing the hydrocarbon in a molten mass consisting of from 20% to 70% of silver monofluoride and from 80% to 30% of silver difluoride maintained at a temperature between 200° C. and 500° C., and introducing fluorine into said molten mass to maintain the fluorine content of said molten mass of silver fluorides substantially constant.

3. The process for fluorinating a hydrocarbon which comprises providing a molten mass consisting of from 20% to 70% of silver monofluoride and from 80% to 30% of silver difluoride, maintaining said molten mass in a state of agitation and at a temperature between 200° C. and 500° C., introducing said hydrocarbon and elemental fluorine at substantially separated positions into said molten mass in such proportions as to maintain the fluorine content of said molten mass of silver fluorides substantially constant, and maintaining said molten mass in heat exchange relation with a heat transfer fluid so as to maintain the reaction temperature substantially constant.

4. The process for fluorinating a petroleum lubricating oil fraction distilling in the range 200–300° C. at 10 millimeters of mercury absolute pressure which comprises providing a molten mass consisting of 70% of silver monofluoride and 30% of silver difluoride, maintaining said molten mass in a state of agitation and at a temperature of approximately 300° C., introducing said oil and fluorine into said molten mass in a ratio of 1 part by weight of oil to 5 parts by weight of fluorine, said oil being introduced into said molten mass at a separated position substantially below the position at which fluorine is introduced into said molten mass, recovering the partially fluorinated organic products of the reaction, introducing said partially fluorinated products and elemental fluorine at substantially separated positions into a second reactor containing an agitated molten mass consisting of from 20% to 40% of silver monofluoride and from 80% to 60% of silver difluoride maintained at a temperature of about 350° C., and recovering a perfluorinated oil substantially free of organic hydrogen from said second reactor.

5. A process as recited in claim 4 in which the fluorine is diluted with an inert gas selected from the group consisting of nitrogen and hydrogen fluoride and the oil fraction is diluted with an inert liquid selected from the group consisting of perfluorinated kerosene, perfluoroheptane, and perfluoro-methyl-cyclohexane.

ROLAND G. BENNER.

REFERENCES CITED

The following references are of record in the file of this patent:

UNITED STATES PATENTS

| Number | Name | Date |
|---|---|---|
| 804,516 | Askenasy et al. | Nov. 14, 1905 |
| 1,891,415 | Harlow et al. | Dec. 20, 1932 |
| 2,013,030 | Calcott et al. | Sept. 3, 1935 |
| 2,034,292 | Grebe | Mar. 17, 1936 |
| 2,140,547 | Reilly | Dec. 20, 1938 |
| 2,140,548 | Reilly | Dec. 20, 1938 |
| 2,140,549 | Reilly | Dec. 20, 1938 |
| 2,140,550 | Reilly | Dec. 20, 1938 |
| 2,140,551 | Reilly | Dec. 20, 1938 |
| 2,423,045 | Passino et al. | June 24, 1947 |

OTHER REFERENCES

McBee et al.: "Ind. Eng. Chem.": vol. 33, pages 137–142 (1941).